April 25, 1961 J. H. HOLLYDAY ET AL 2,981,046
PICK-UP AND BALER CONTROL MEANS
Filed Feb. 2, 1959 3 Sheets-Sheet 1
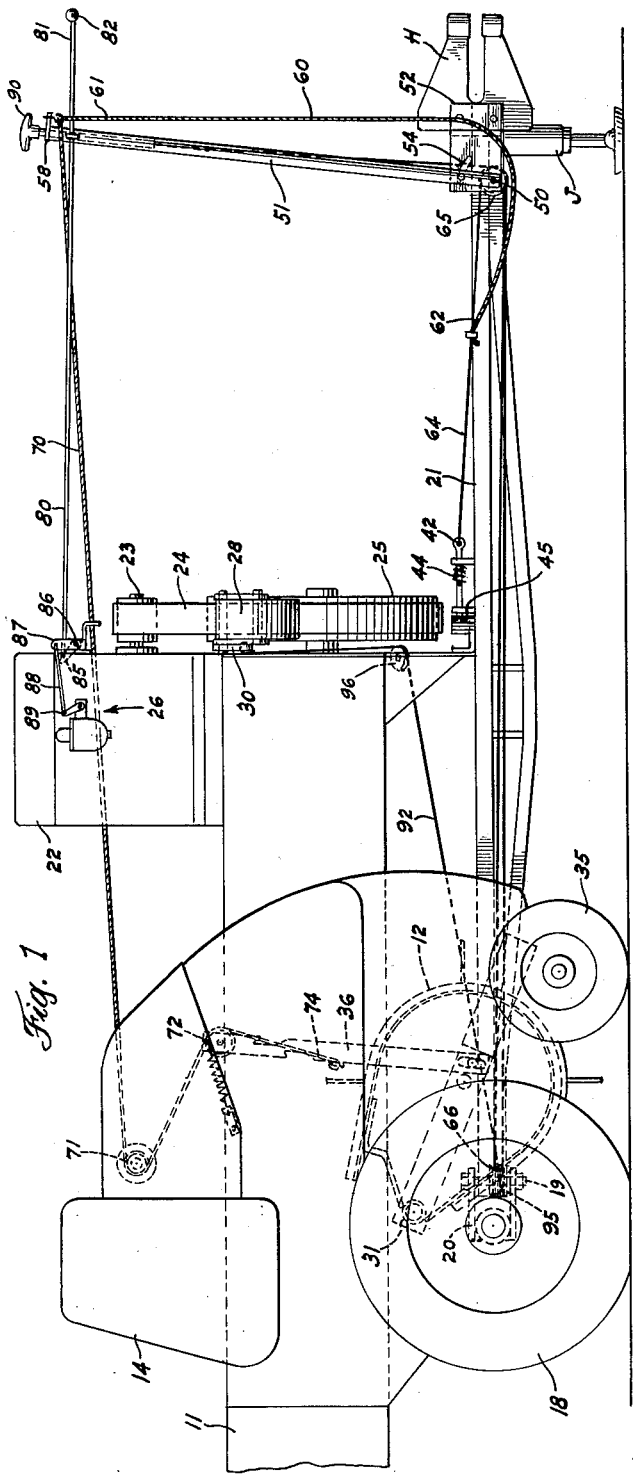
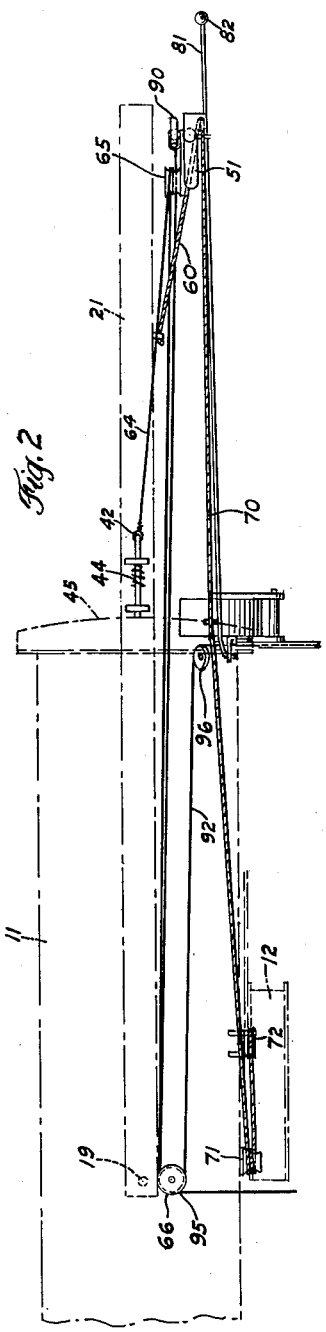
INVENTORS
JAMES H. HOLLYDAY AND
ROBERT G. YOUNG
By Joseph Allen Brown
ATTORNEY

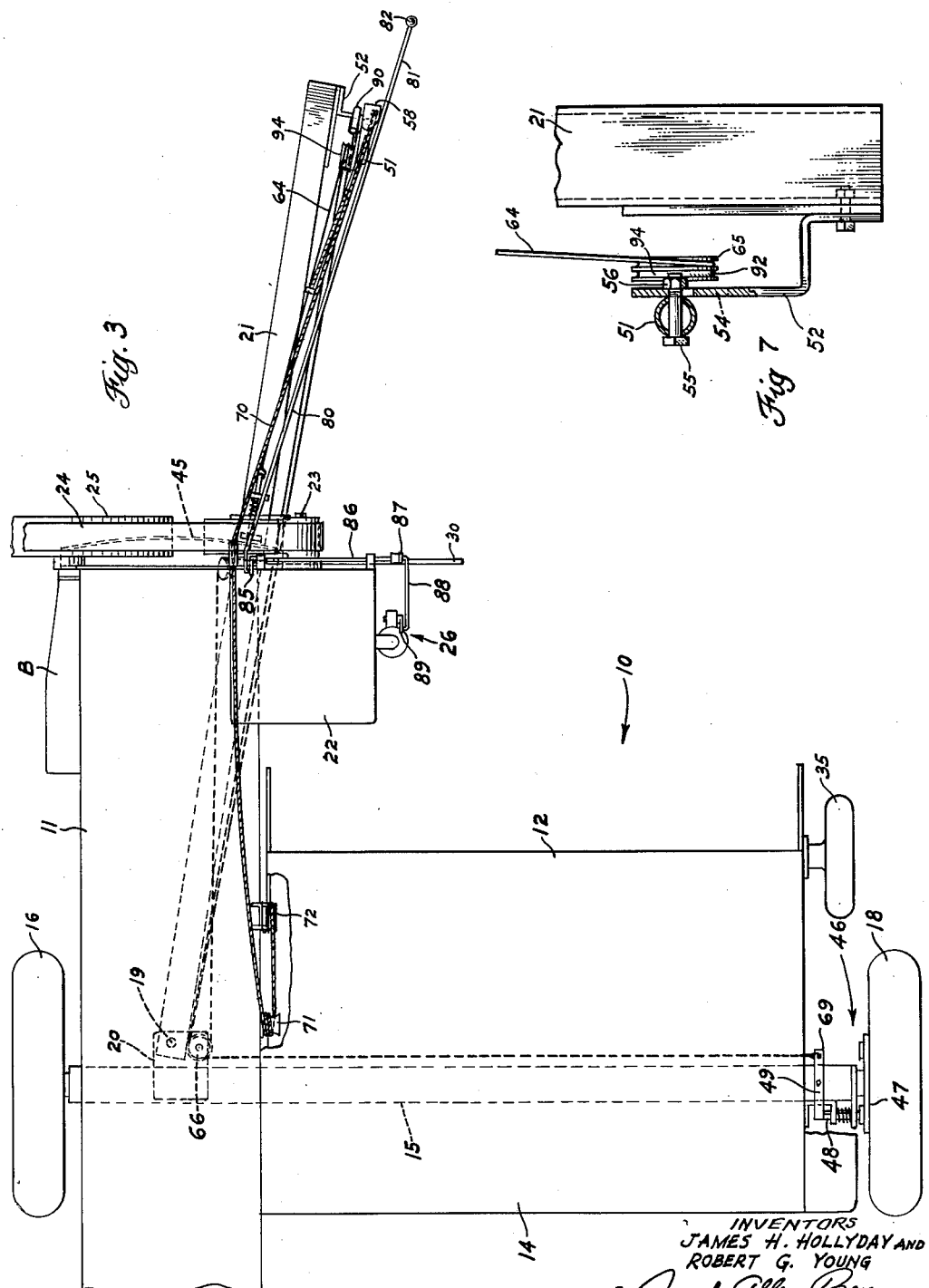

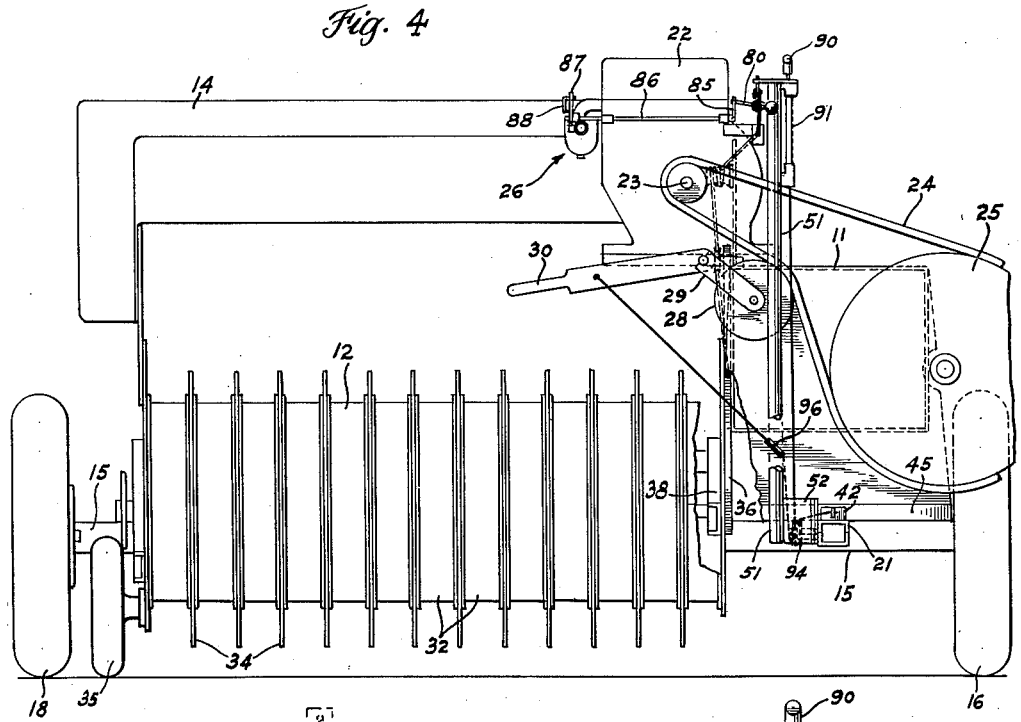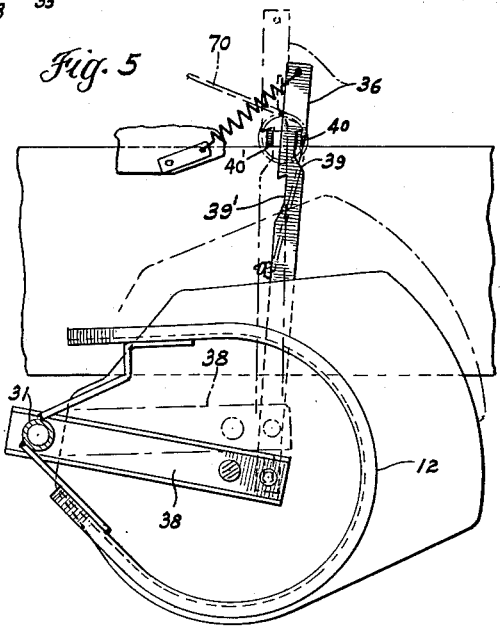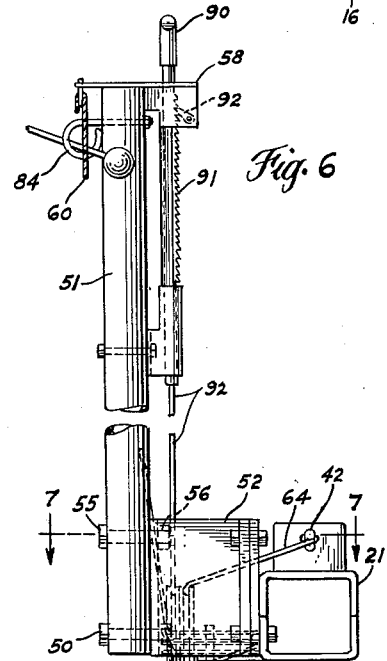

United States Patent Office 2,981,046
Patented Apr. 25, 1961

2,981,046

PICK-UP AND BALER CONTROL MEANS

James H. Hollyday, New Holland, and Robert G. Young, Bird in Hand, Pa., assignors to Sperry Rand Corporation, New Holland, Pa., a corporation of Delaware Filed Feb. 2, 1959, Ser. No. 790,664

3 Claims. (Cl. 56—341)

The present invention relates generally to hay balers and more particularly to a hay baler having an engine mounted thereon to operate the baler, as contrasted with a power-take-off baler which derives its operating power from the vehicle which tows the baler. Still more specifically, the invention relates to control means for an automatic, engine mounted hay baler.

A hay baler of the character described has a pick-up mechanism for elevating crop material and delivering it to a feeder mechanism. The pick-up is adapted to be positioned adjacent the ground when in use and latched in an elevated position when not in use. Generally, the operator stands on the ground and raises and lowers the pick-up manually to desired position utilizing latch means to lock the pick-up in desired position. Also, a conventional baler has a fore-and-aft extending tongue whereby the baler may be attached to the tractor or other vehicle which is to tow the baler. Conventionally, such tongue is laterally swingable from an inboard road travel position to an outboard operative position when baling is to be done. A latch is provided for locking the tongue in a given position. Further, conventionally, the engine mounted on the baler has a throttle adapted to be set by the operator to a desired speed. The connection from the baler motor to the baling mechanism to be driven thereby is usually through an endless belt provided with a belt tightener. Usually, mechanical means is provided whereby an operator, standing on the ground, can manipulate the belt tightener.

Raising and lowering the pick-up, shifting the baler tongue, operating the motor throttle and tightening and releasing the drive belt requires the baler operator to climb on and off the tractor a good many times when baling is to be done. For example, if the baler operator wishes to stop for a minute or two during a baling operation, and he wishes to disengage the drive to the baling mechanism, it is necessary that he climb down off the tractor, and go back and release the belt tightener to shut off the drive. He likewise cuts the throttle on the engine to idle position until baling is to be resumed. These operations cannot be performed without the operator leaving his seat on the tractor. Also, when the operator tows the baler on the open highway, he will have the pick-up of the baler in elevated position. When the baler reaches the field where it is to operate, the operator must climb down off the tractor, go back and drop the pick-up and then climb back onto the tractor to commence the baling operation. When the baling is completed, it is necessary for the operator to go back and lift the pick-up and relatch it in elevated position and go back to the tractor to take the baler to storage. There are many other instances in which the operator has to get on and off the tractor to control or set various elements of the baler.

The primary object of this invention is to provide means whereby an operator can completely control the operation of an engine mounted hay baler without having to leave the seat of the vehicle towing the baler.

Another object of this invention is to provide a control stand at the forward end of the baler and within ready reach of the operator whereby he can reach various control members on the control stand and connected to various parts of the baler to operate them.

A further object of this invention is to provide in an automatic hay baler control means whereby an operator can raise and lower a pick-up, operate a motor throttle, control the shifting of a baler tongue, and tighten or loosen a belt without ever having to leave the tractor seat.

Another object of this invention is to accomplish the above with a control mechanism which is of simple construction and has few parts easily manufactured and assembled.

A still further object of this invention is to provide a control stand which is mounted on a baler tongue and adjustable relative thereto to position control members thereon within ready reach of the operator.

Other objects of this invention will be apparent hereinafter from the specification and from the recital in the appended claims.

In the drawings:

Fig. 1 is a fragmentary, generally diagrammatic side elevation of a hay baler having a control mechanism constructed according to this invention, the baler tongue extending in a middle position;

Fig. 2 is a diagrammatic plan view showing the control mechanism in full lines and associated structure in dotted lines;

Fig. 3 is a diagrammatic plan view of Fig. 1 but showing the baler tongue in inward road travel position;

Fig. 4 is a front elevation of the baler shown in Fig. 1;

Fig. 5 is an enlarged fragmentary view of the pick-up and its lifting lever, the pick-up being shown in one raised position in full lines and in a higher raised position in dot-dash lines;

Fig. 6 is an enlarged, broken, elevational view of the control mechanism and the controls thereon; and Fig. 7 is a section taken on the line 7—7 of Fig. 6 and looking in the direction of the arrows.

Referring now to the drawings by numerals of reference, 10 denotes a hay baler having a fore-and-aft extending bale chamber 11, a pick-up 12, and a feeder mechanism contained in housing 14. The baler is supported on a frame including transverse member 15 having ground wheels 16 and 18 at its respective ends. Pivoted about vertical pin 19 on a bracket 20 connected to member 15 is the rearward end of a tongue 21. The tongue extends forwardly and is swingable laterally about the vertical axis of the pin. As is conventional with hay balers, the tongue is adapted to be positioned in an outboard manner when the baler is being operated and swung to an inboard position when the baler is transported on the highway. A hitch H is provided at the forward end of tongue 21 for connection to a tractor drawbar. A retractable jack J is provided to support the tongue when the baler is unhitched.

Mounted on top of bale case 11 is a motor 22 having an output shaft 23 connected through endless belt 24 to a flywheel 25. Flywheel 25 transmits power to a gear box B which in turn supplies power for various elements of the baler. Motor 22 includes a throttle 26. The belt 24 between the engine 22 and the flywheel 25 is normally slack, there being provided a belt tightener wheel 28 (Fig. 4) carried on an arm 29 pivoted toward or away from belt 24 by means of a handle 30.

The pick-up 12 is supported on the baler frame for pivotal movement about the axis of a cross pipe 31, Figs. 1 and 5. The pick-up has a plurality of relatively spaced stripper members 32, Fig. 4, between which pick-up tines 34 extend and which on rotation of the reel which carries the tines, picks up the crop material and conveys it rearwardly to the conveying mechanism in the housing 14. Pick-up 12 includes a ground wheel 35 and a vertically extending inboard lift lever 36 connected to one of the support arms 38 on the pick-up and through which the pick-up may be raised and lowered. Lever 36 has notches 39 and 39' cooperative with latch members 40 and 40', respectively, whereby the pick-up can be latched in various elevated positions.

Mounted on tongue 21 and operative to latch the tongue in laterally adjusted position is a latch pin 42, Fig. 1, which is biased by a spring 44 toward pin receiving holes, not shown, in arcuate latch plate 45.

It will also be noted that the ground wheel 18 is provided with a brake 46, Fig. 3, including brake elements 47 and 48 carried on wheel 18 and frame member 15, respectively. The brake member 48 comprises a reciprocable pin, the reciprocation of which is controlled by a pivoted lever 49.

The structural elements just described are conventional. Applicants' invention resides in the means provided for controlling the operation of these elements from a given control position at the forward end of the baler. Such control means will now be described.

Pivotally mounted on a pin 50, Fig. 6, is a control stand 51 which extends vertically relative to the forward end of the tongue. Pin 50 connects the stand to a bracket 52 bolted to tongue 21. Bracket 52 has an arcuate slot 54 extending concentric to the axis of the pin 50. A threaded bolt 55 extends through the control stand and through the slot 54 in plate 52. A nut 56 is threaded onto the bolt whereby the stand can be locked in adjusted position. It will be apparent that by loosening the nut 56, the control stand can be adjusted forwardly or rearwardly about the pivot pin 50. With this structure, the position of the upper end section 58 of the control stand can be disposed to suit the tractor operator. It is intended that the end 58 of the control stand be positioned within ready reach of the operator.

For controlling the operation of the latch pin 42 and the brake 46 to wheel 18, a rope control 60 is provided. One end 61 of the rope is attached to the upper end of the control stand 51. Another end 62 of the rope is connected to a cable 64 having one end connected to latch pin 42. Cable 64 extends forwardly along tongue 21 and around a pulley 65 and then rearwardly to a pulley 66 adjacent pivot pin 19. The cable extends around pulley 66 and then transversely to one end 69 of lever 49 for controlling brake 46. When rope 60 is pulled, the latch pin 42 is retracted to unlatch tongue 21 and the lever 49 is pivoted to apply the brake 46. With the brake to the wheel 18 applied, the operator of the baler can back the tractor or pull it forwardly which will cause the baler to pivot about the wheel 18. This will bring about a swinging of the tongue 21 inboard or outboard, as the case may be, where it can be relatched by releasing rope 60.

This same rope, or another rope, may be used to raise and lower the pick-up 12. A reach 70 of the rope extends rearwardly from the upper end 58 of the control stand 51. The rope is passed around a capstan 71 and then around a pulley 72 mounted on the baler. The end 74 of rope 70 is connected to lift lever 36 for the pick-up. By pulling the rope 70, the pick-up can be elevated. By releasing the rope, the pick-up can be lowered. Suitable manipulation of the rope pull can be utilized to control the latching of the hooks 39—39' of lever 36 with the latch members 40 and 40'.

To control the operation of the throttle 26 a push-pull rod 80 is provided. Rod 80 extends in a fore-and-aft direction and has a forward end 81 provided with a knob or handle 82. The rod is slidable in the eye of a hook 84 carried on control stand 51. The rear end of rod 80 is connected to an arm 85 carried on a rock shaft 86. Secured to the other end of the rock shaft is another arm 87 which is connected by a link 88 to throttle control arm 89. The throttle control arm 89 is pivoted forwardly or rearwardly responsive to reciprocation of the push-pull rod 80 and thereby the motor 22 is controlled.

For controlling the belt tightener wheel 28, a handle 99 is provided at the upper end of a ratchet bar 91 having a cooperative pawl 92 (Fig. 6) carried on the upper end of the control stand. The ratchet bar 91 is rotatable relative to the control stand by manipulation of handle 90. When in one rotatable position, the pawl 92 is adapted to engage with the teeth on the ratchet bar. Thus, when handle 90 is pulled upwardly, the pawl will skip along the ratchet teeth and when the movement of the bar is stopped, the pawl will hold it in such position. To release the bar, it is merely necessary to rotate it using handle 90 and thereby disengage the teeth of the bar from pawl 92.

Connected to the lower end of the ratchet bar is a cable 92 which extends downwardly and around a pulley 94. From there the cable extends rearwardly to a pulley 95 (Fig. 1) next to pulley 66. Then it extends forwardly to a pulley 96 and finally upwardly to the control handle 30. This extensive reaching of cable 92 is provided so that its extension to handle 30 will not change materially on lateral adjustment of tongue 21.

When the cable 92 is drawn taut, the handle 30 is pivoted to force the tightener wheel 28 against the belt 24 to thereby provide a drive between motor 22 and the flywheel 25. When the pulling force on the cable is released, the natural resiliency of the endless belt 24 will cause the belt tightener to shift back to inoperative position. Also, the weight of wheel 28 causes it to drop away from belt 24 when cable 92 is released.

With the structure described, the operator riding on the tractor can control all the normal operations of the baler. Utilizing the rope 60, he can unlatch the baler tongue and apply the brake 46 and thereby readily shift the tongue from an inboard to an outboard position or vice versa. By pulling on the rope 70, he can raise or lower the pick-up as desired. By operating the push-pull rod 80, the throttle control 26 for the motor 22 can be operated. By manipulating the handle 90, the cable 92 can be drawn taut or released to thereby operate the belt tightener 28. The forward or terminal ends of all of these control members are disposed at the upper end 58 of the control stand 51 and within ready reach of the tractor operator. The operator can in all respects operate the baler without having to leave the tractor. Since the stand 51 is adjustable it can be properly positioned according to the desire of the operator.

While this invention has been described in connection with a particular embodiment thereof, it will be understood that it is capable of further modification and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described our invention, what we claim is:

1. In an automatic, engine mounted hay baler having a wheel supported frame, a pick-up, means mounting said pick-up on said frame for vertical adjustment relative thereto, a fore-and-aft extending tongue pivotally connected adjacent its rear end to said frame and having a hitch at its forward end connectable to a vehicle for towing the baler, means latching said tongue to said baler in pivotally adjusted position, a motor mounted on said baler, a throttle controlling the speed of said motor, a baler drive mechanism, means including an endless belt drivingly connecting said motor to said baler drive mechanism, and a tightener supported on said baler and swingable toward and away from said belt to tighten and loosen same, the combination of a control stand extending upwardly from said tongue and having a section within reach of the vehicle operator, means connecting the lower end of said control stand to said tongue for adjustment relative thereto whereby the position of said stand section can be varied according to the desire of the operator, means connected to said pick-up and extending therefrom to said stand section for vertically adjusting the pick-up, operating means connected to said tongue latching means and extending therefrom to said stand section for operating the tongue latching means, control means connected to said throttle and extending therefrom to said stand section for controlling said throttle, and means connected to said belt tightener and extending therefrom to said stand section for moving said tightener toward and away from said belt.

2. An automatic, engine mounted hay baler as recited in claim 1 wherein the lower end of said control stand is pivotally connected to said tongue for swinging movement about an axis transverse to the fore-and-aft extension of the tongue, and there is means interposed between the stand and the tongue for locking the stand in adjusted position.

3. An automatic, engine mounted hay baler as recited in claim 2 wherein said stand locking means comprises a plate fastened to said tongue and extending upwardly therefrom and alongside the stand, said plate having an arcuate slot concentric with the pivotal connection of the stand with the tongue, a threaded bolt carried on said stand and projecting through said slot, and a nut threaded into the pin to lock the stand in adjusted position relative to said plate.

References Cited in the file of this patent

UNITED STATES PATENTS

| | | |
|---|---|---|
| 2,334,441 | Rodrigues et al. | Nov. 16, 1943 |
| 2,634,675 | Heinje | Apr. 14, 1953 |
| 2,696,164 | Droll | Dec. 7, 1954 |

FOREIGN PATENTS

| | | |
|---|---|---|
| 755,857 | Great Britain | Aug. 29, 1956 |